United States Patent
Kinkead et al.

(10) Patent No.: US 12,144,293 B1
(45) Date of Patent: Nov. 19, 2024

(54) BATTERY POWERED DEBRIS BLOWER

(71) Applicant: TURFCO MANUFACTURING, INC., Blaine, MN (US)

(72) Inventors: Scott Kinkead, Hopkins, MN (US); Lucas Crist, Coon Rapids, MN (US); Nicholas Oeding, Shoreview, MN (US)

(73) Assignee: TURFCO MANUFACTURING, INC., Blaine, MN (US)

( * ) Notice: Subject to any disclaimer, the term of this patent is extended or adjusted under 35 U.S.C. 154(b) by 368 days.

(21) Appl. No.: 17/523,068

(22) Filed: Nov. 10, 2021

Related U.S. Application Data

(60) Provisional application No. 63/112,742, filed on Nov. 12, 2020.

(51) Int. Cl.
  *A01G 20/47* (2018.01)
(52) U.S. Cl.
  CPC .................................. *A01G 20/47* (2018.02)
(58) Field of Classification Search
  CPC ....................................................... A01G 20/47
  See application file for complete search history.

(56) References Cited

U.S. PATENT DOCUMENTS

| | | | | |
|---|---|---|---|---|
| 5,090,088 A * | 2/1992 | Toth | ...................... | E01H 1/0809 15/354 |
| 6,009,595 A * | 1/2000 | Leasure | ................ | E01H 1/0809 15/327.5 |
| 6,226,833 B1 * | 5/2001 | Kawaguchi | ............. | A47L 9/009 15/330 |
| 7,841,044 B1 * | 11/2010 | Weihl | ..................... | A01G 20/47 15/418 |
| 7,962,996 B1 * | 6/2011 | Mondello | ............... | A01G 20/47 15/360 |
| 9,038,232 B1 * | 5/2015 | Morrow | .................. | A01G 20/47 15/300.1 |
| 9,510,516 B2 * | 12/2016 | Shumaker | ............. | A01G 20/47 |
| 9,560,810 B2 * | 2/2017 | Kinkead | ................ | A01G 20/47 |
| 9,986,692 B2 | 6/2018 | Kinkead et al. | | |
| 10,683,023 B1 | 6/2020 | Cook et al. | | |
| 10,779,455 B1 | 9/2020 | Cook et al. | | |
| 10,999,964 B1 | 5/2021 | Cook et al. | | |
| 2002/0190672 A1 * | 12/2002 | Karikomi | ............. | H02P 29/026 318/139 |
| 2007/0220702 A1 * | 9/2007 | Lauer | .................... | F04D 29/626 15/405 |

(Continued)

FOREIGN PATENT DOCUMENTS

WO  WO-2014119181 A1 *  8/2014  ......... F04D 25/0673

*Primary Examiner* — Marc Carlson
(74) *Attorney, Agent, or Firm* — Best & Flanagan LLP

(57) ABSTRACT

When a GPS unit electronically detects being within a boundary, a motor controller electronically controls providing electrical power from a battery pack to a high-speed electric motor directly driving a rotatable turbine rotor inside a cylindrical housing at operational speeds. The motor controller electronically controls the high-speed electric motor to stop rotation, to rotate at operational speeds, or to rotate at turbo boost speeds. A single remote electronically controls multiple motor controllers. The motor controller inverts DC battery voltage of 100 volts to 3-phase alternating current used by the high-speed electric motor. A DC-DC converter is electrically connected between the battery pack and a nozzle motor and a display.

6 Claims, 3 Drawing Sheets

(56) References Cited

U.S. PATENT DOCUMENTS

| | | | |
|---|---|---|---|
| 2010/0146730 A1* | 6/2010 | Iacona | A01G 20/47 15/405 |
| 2012/0246865 A1* | 10/2012 | Lauer | A01D 42/06 15/405 |
| 2015/0190021 A1* | 7/2015 | Barkow | E01H 1/0809 15/405 |
| 2015/0196179 A1* | 7/2015 | Kinkead | A01G 20/47 29/428 |
| 2016/0113207 A1* | 4/2016 | Shumaker | B08B 5/02 15/405 |
| 2016/0120131 A1* | 5/2016 | Conrad | F04D 25/0673 15/319 |
| 2016/0198636 A1* | 7/2016 | Poole | A01G 20/47 15/327.5 |
| 2017/0112071 A1* | 4/2017 | Shumaker | E01H 1/0809 |
| 2019/0211843 A1* | 7/2019 | Dygert | F04D 25/12 |
| 2019/0275657 A1* | 9/2019 | Lanquist | B25F 5/00 |
| 2020/0084978 A1* | 3/2020 | Weihl | B62D 51/04 |
| 2020/0120881 A1* | 4/2020 | Hall | F04D 29/464 |
| 2020/0296893 A1* | 9/2020 | Bohrer | A01G 20/47 |
| 2020/0331037 A1* | 10/2020 | Wooden | B08B 5/02 |
| 2021/0114673 A1* | 4/2021 | Street | E01H 1/0809 |
| 2022/0104425 A1 | 4/2022 | Cook | |
| 2022/0111894 A1 | 4/2022 | Cook | |
| 2022/0142043 A1 | 5/2022 | Cook et al. | |
| 2022/0186745 A1* | 6/2022 | Anania | F04D 17/16 |
| 2022/0354045 A1 | 11/2022 | Cook et al. | |

* cited by examiner

BATTERY POWERED DEBRIS BLOWER

BACKGROUND

A battery powered debris blower and its methods of fabrication and use are disclosed.

Mobile debris blowers have been developed for blowing leaves and other debris from large areas such as golf courses. The blowers of U.S. Pat. Nos. 9,560,810 and 9,986,692 have achieved considerable market success. Mobile debris blowers are powered by internal combustion engines (ICEs) which are subject to increasingly stringent noise and emissions regulation and taxation. Some jurisdictions prohibit the use of ICE-powered equipment entirely. The mobile turbine blowers not powered by ICEs use a PTO or hydraulic drive from the tractor or tow vehicle they connect to instead of being self-powered by an ICE. However, the power requirements of these PTO or hydraulic systems are beyond the ability of all but the most powerful tractors and require more driver training to operate than self-powered blowers. Tractors large enough to power these blowers are too heavy or are not maneuverable enough to operate in some areas where blower use is desired. Internal combustion engines also require maintenance in the form of oil and filter changes, spark plug changes, and other work that requires trained mechanics on a regular basis.

Thus, a need exists for an improved debris blower which is not powered by an ICE and which overcomes the deficiencies of conventional debris blowers.

SUMMARY

This need and other problems in the field of debris blower design is solved by providing a debris blower which is powered by a battery pack. Particularly, the battery powered debris blower includes a cylindrically shaped housing including an arcuately shaped exit nozzle. A stationary turbine stator and a rotatable turbine rotor are inside of the housing. A motor controller is electrically connected between a battery pack and a high-speed electric motor directly driving the rotatable turbine rotor. The housing is transportable with an axis of the housing and the rotatable turbine rotor being parallel to a surface. In forms shown, the battery pack provides direct current voltage of 100 volts, and the high-speed electric motor uses 3-phase alternating current. A DC-DC converter steps down voltage from the battery pack to a display and a nozzle rotating motor.

In further aspects, using a GPS unit, the rotatable turbine rotor is electronically controlled to rotate at operational speeds when electronically detected that the debris blower is within a boundary and is electrically controlled to stop rotation when electronically detected that the debris blower is outside the boundary.

In additional aspects, a control electronically controls stopping the rotation of the rotatable turbine rotor, rotating the rotatable turbine rotor at an idle speed, rotating the rotatable turbine rotor at operational speeds, and rotating the rotatable turbine rotor at turbo boost speeds. In further aspects, a remote control simultaneously electronically controls the motor controllers of two or more battery powered debris blowers.

Illustrative embodiments will become clearer in light of the following detailed description in connection with the drawings.

DESCRIPTION OF THE DRAWINGS

The illustrative embodiments may best be described by reference to the accompanying drawings where.

Figure 1:
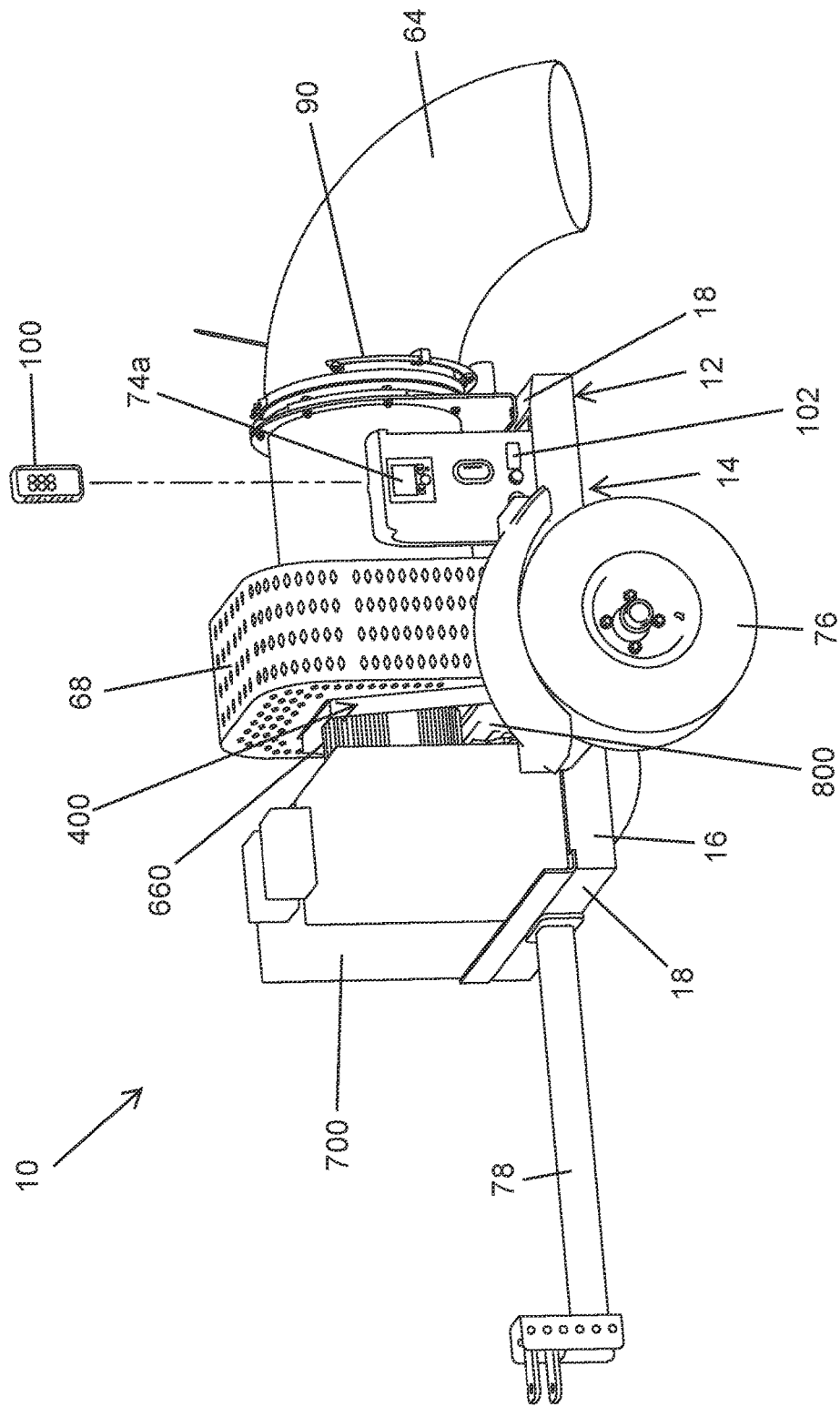
FIG. 1 shows a perspective view of a battery powered debris blower.
Figure 2:
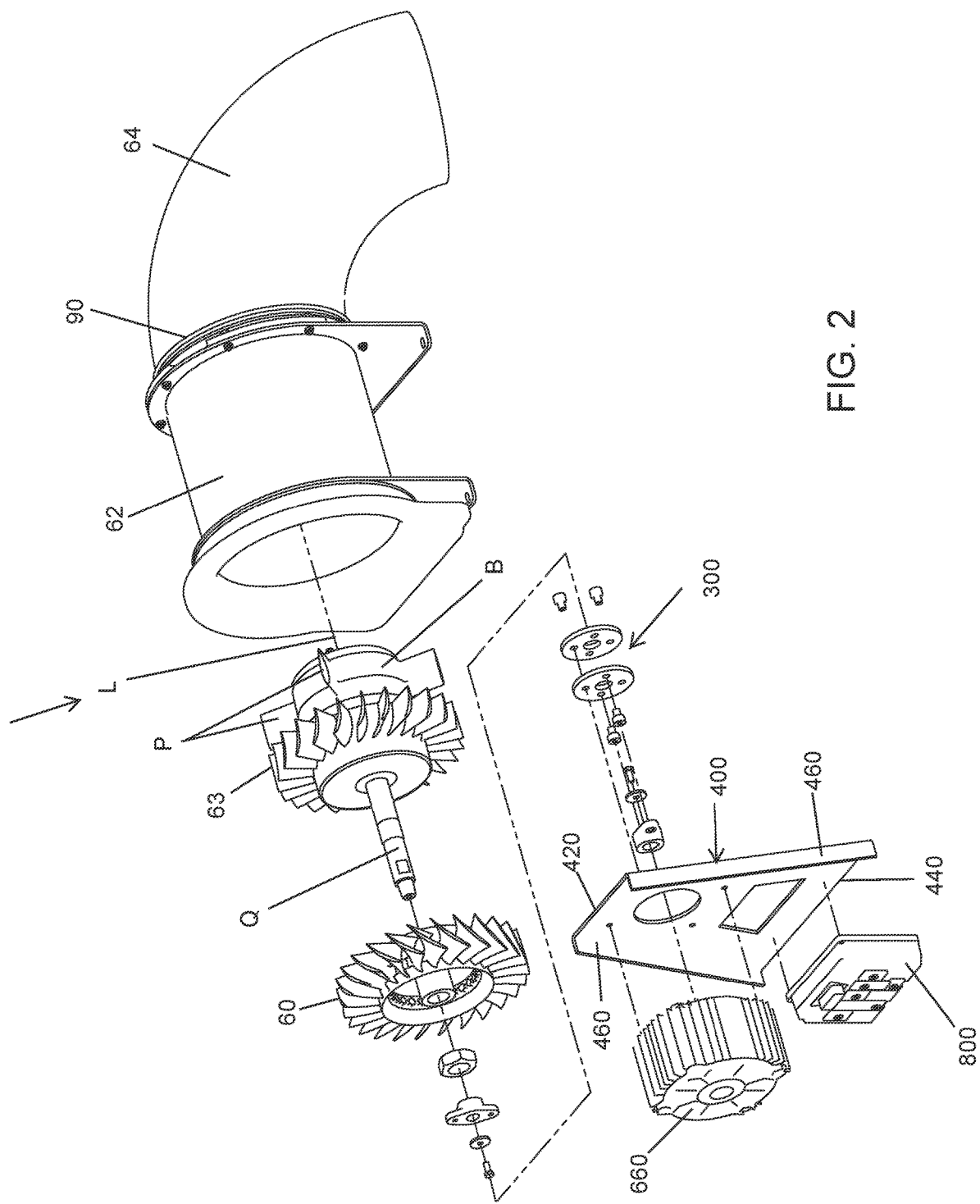
FIG. 2 shows an exploded perspective view of portions of the battery powered debris blower of FIG. 1.
Figure 3:
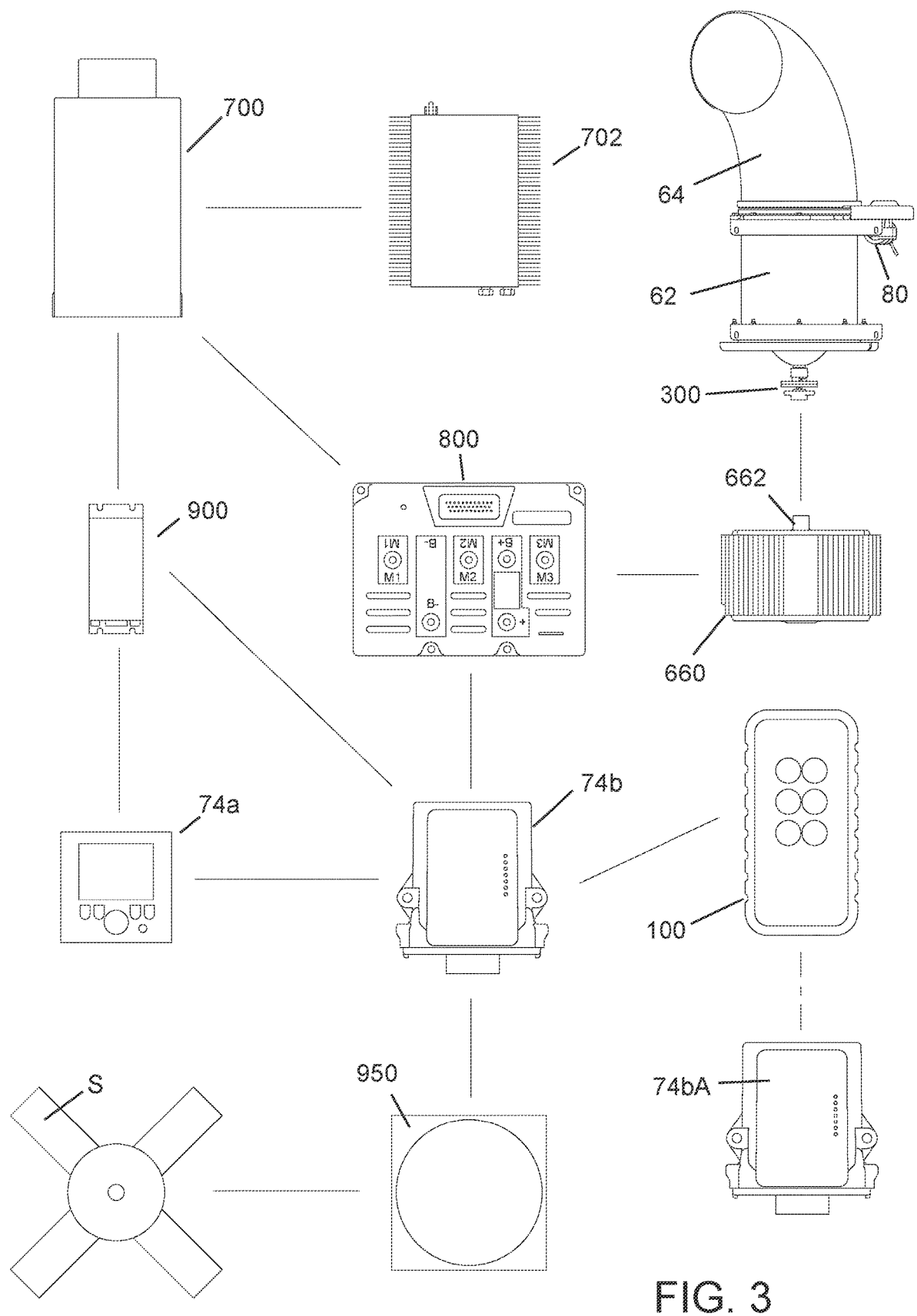
FIG. 3 shows an electrical schematic for the battery powered debris blower of FIG. 1.

All figures are drawn for ease of explanation of the basic teachings only; the extensions of the figures with respect to number, position, relationship, and dimensions of the parts to form the illustrative embodiments will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "top", "bottom", "first", "second", "forward", "rearward", "reverse", "front", "back", "height", "width", "length", "end", "side", "horizontal", "vertical", and similar terms are used herein, it should be understood that these terms have reference only to the structure shown in the drawings as it would appear to a person viewing the drawings and are utilized only to facilitate describing the illustrative embodiments.

DESCRIPTION OF THE ILLUSTRATIVE EMBODIMENTS

A debris blower 10 is shown in the drawings which include reference numerals shown and described in U.S. Pat. Nos. 9,560,810 and 9,986,692, the content of which are hereby incorporated herein by reference. Blower 10 includes a chassis 12 having a rectangular frame 14 including first and second sides 16 extending generally perpendicular between first and second ends 18. In the form shown, sides 16 and ends 18 have rectangular cross sections. Furthermore, in the form shown, sides 16 and ends 18 are interconnected together by being beveled at 45° and interconnected together by welding. Chassis 12 further includes cross braces extending generally perpendicularly between sides 16 intermediate ends 18. Cross braces are suitably connected to frame 14 such as by welding.

Chassis 12 further includes a motor mount 400 of a generally right parallelepiped shape. Specifically, mount 400 includes a planar top 420, a planar bottom 440 and first and second side walls 460. Mount 400 can be suitably connected to one of the cross braces of chassis 12 such as by welding and extends upwardly from chassis 12 parallel to and spaced intermediate ends 18.

Debris blower 10 further includes a turbine rotor 60 rotatable about a linear axis L inside a housing 62 having an exit nozzle 64 rotatably coupled thereto about linear axis L and rotated by a nozzle motor 80. A turbine stator 63 remains stationary inside of housing 62 behind turbine rotor 60 and in front of exit nozzle 64 for compressing the air stream created by turbine rotor 60 sufficient to move debris on the ground surface. Housing 62 is suitably secured to two of the cross braces of chassis 12. Particularly, housing 62 has a cylindrical shape including linear axis L. Exit nozzle 64 has a cylindrical shape including an arcuate axis and is rotatably coupled to a second end of housing 62. Debris blower 10 further includes a body B of a cylindrical shape of a smaller diametric size than the cylindrical shape of housing 62. Circumferentially spaced spindles P extend from body B to the inside of housing 62. Turbine stator 63 is fixed to body B. A shaft Q is rotatably mounted in body B and turbine stator 63 and extends along linear axis L. Turbine rotor 60 is rotatably fixed to shaft Q.

A high-speed electric motor 660 is suitably mounted to mount 400 located adjacent the first end of housing 62, with the second end being opposite to the first end of housing 62 along linear axis L. Turbine rotor 60 is located intermediate turbine stator 63 and the first end of housing 62. High-speed electric motor 660 includes an output shaft 662 which can be rotated at speeds up to in the order of 5,000 revolutions per minute. A direct drive linkage 300 connects high-speed electric motor 660 to shaft Q and to turbine rotor 60. Specifically, direct drive linkage 300 rotatably fixes output shaft 662 to shaft Q and turbine rotor 60, such that output shaft 662, shaft Q, and turbine rotor 60 have the same rotational speed. A screen type guard 68 extends from rectangular frame 14 and extends between motor 660 and the first end of housing 62 and encloses direct drive linkage 300 between motor 660 and turbine rotor 60.

A battery pack 700 and an electronic speed controller (ESC) 800 are suitably mounted to chassis 12. ESC 800 is electrically connected between battery pack 700 and high-speed electric motor 660. Debris blower 10 further includes a wireless remote control 100 and an auxiliary control 102 hard wired to ESC 800. ESC 800 includes an IFM display 74a, a transceiver 74b for receiving signals from controls 100 and 102, and a GPS unit 950 which is networked with a GPS satellite S. Debris blower 10 also includes a charger including a charge controller 702 for charging battery pack 700. Charger including charge controller 702 can be mounted to chassis 12 or chassis 12 can be moveable relative thereto. Wheels 76 or other forms of transport on a surface are suitably secured to first and second sides 16. A hitch 78 is suitably secured to first end 18.

Nozzle 64 is rotated relative to housing 62 by nozzle motor 80 and includes a circumferential positioning locator 90 shown extending concentrically around nozzle 64 and linear axis L relative to housing 62. Locator 90 allows the user to set stopping points for both left and right hand sides to blow debris more efficiently by having nozzle 64 always at the optimal acute angle to the ground surface.

High-speed electric motor 660 in the form shown is 3 Phase AC, with 54 horse power @ 420 Amp/116 volt and continuous 27 horse power @ 210 Amp/102 volt, and particularly is a Zero motorcycle ZF 75-5 motor. Battery pack 700 is connected in parallel to double the capacity, and in the form shown is 102 volt direct current with a 10.6 KW hour capacity and particularly are Farasis cell from Zero motorcycles. Since the battery pack 700 is relatively high capacity and high output, an additional port and inverter may be added to allow blower 10 to function as a generator in the field, providing 110 VAC power to non-cordless power tools and equipment.

ESC 800 is required to operate motor 660 and invert the direct current battery voltage supplied to 3-phase alternating current used by motor 660. A DC converter 900 in the form shown is a 500 W DC-DC converter that steps down the 102 VDC of battery pack 700 to 12 VDC to power display 74a, transceiver 74b, nozzle motor 80 and auxiliary control 102. ESC 800 allows a CANbus connection to display 74a and charge controller 702, with display 74a showing information such as battery level, estimated battery life, time to full charge (when charging the batteries), diagnostic codes, or allow for the adjustment of presets. Temperature monitoring of battery pack 700, ESC 800, and motor 660 can be combined with estimations of battery life to adjust the output of blower 10 to achieve a given level of battery longevity.

When the battery pack 700 is depleted to a preset level, ESC 800 can drive motor 660 at a reduced speed ('derate' the motor) in the order of 1500 RPMs and disable high power output settings such as 'turbo boost' to allow continued use of blower 10 while warning the operator that battery pack 700 requires charging.

Blower 10 uses high-speed electric motor 660 driving direct drive linkage 300 connected to turbine rotor 60. This is important for several reasons. First, increased efficiency is provided over systems that would use a gearbox, belt, hydraulic, chain, or other transmission element by avoiding power wasted through friction. This also avoids the additional maintenance and adjustment required for each alternative transmission element. A drive system with fewer components also reduces the noise created in operation and reduces the likelihood of component failure, ultimately extending the life of the drive elements of blower 10. Finally, since linkage 300 is relatively small, the size of the drive system does not require blower 10 to be larger than equivalent ICE-powered blowers.

High-speed electric motor 660 providing motive force to turbine rotor 60 is rated for a power output significantly greater than the power output of the ICE used to power similar blowers. High-speed electric motor 660 will be rated for peak output far greater than their output in continuous-duty applications due to the heat limitations of motor performance. This allows blower 10 to have an additional 'turbo-boost' function that provides a short-duration increase in power output up to a maximum operational turbine speed since it is not limited to the steady-state peak power output of an ICE.

ICE-powered mobile turbine blowers will typically drive the turbine at peak engine operational power in steady-state operation. When an operator needs to get the blower ready for use, these designs require the operator to stop their tow vehicle, walk back to the blower, start the engine, and return to the tow vehicle. In between passes or while traveling between work sites, they will sometime use a function to allow the engine to idle to reduce noise, wear, and fuel consumption. Blower 10, in contrast, can be fully stopped, allowed to 'coast' or turn slowly, and resume operation remotely with the operator remaining with the tow vehicle. Additionally, blower 10 does not generate noise when not in operation. This is especially important in noise-sensitive communities around golf courses or other areas where early-morning operation in proximity to residential areas is required.

Idle/resume can function similar to the blowers disclosed in U.S. Pat. Nos. 9,560,810 and 9,986,692 with the 'idle' consisting of the turbine holding a preset RPM that optimizes for minimum power draw and minimum time to reach operational speed without undue wear on the turbine components. This setpoint may be adjusted via control 100 or 102.

Now that the basic construction of blower 10 has been explained, a mode of operation can be set forth and appreciated. Specifically, a stream of air is created by rotating turbine rotor 60 inside housing 62 by high-speed electric motor 660 connected by direct drive linkage 300 to turbine rotor 60. High-speed electric motor 660 is powered by battery pack 700. The stream of air is directed at an acute angle to the ground surface including debris to be blown by rotating nozzle 64 relative to housing 62. While being directed at the acute angle, the stream of air is moved along the ground surface by pulling hitch 78 such that chassis 12 moves on wheels 76 on the ground surface. The air stream is created at the start of a path such as by actuating a switch in control 100 or 102. Particularly, control 100 or 102 electronically controls ESC 800 to not supply 3-phase alternating current to motor 660 to stop rotation of turbine rotor 60, to supply 3-phase alternating current to motor 660 to rotate turbine rotor 60 at an idle speed in the order of 1500 RPMs, to supply 3-phase alternating current to motor 660 to rotate turbine rotor 60 at operational speeds in the order of 3900 RPMs, or to supply 3-phase alternating current to motor 660 to rotate turbine rotor 60 at turbo boost speeds in the order of 4200 RPMs. It can be appreciated that turbo boost speeds are greater than operational speeds which is greater than idle speeds.

The creation of the air stream is stopped at the end of the path such as by actuating a switch in control 100 or 102. It should be appreciated that when the air stream is stopped, turbine rotor 60 and high-speed electric motor 660 are not rotating such that drain of battery pack 700 and noise of operation are minimized. Battery pack 700 provides electrical power allowing blower 10 to be networked with an autonomous tow vehicle, turning blower 10 on and off at specific locations, such as only when driving over a golf course fairway. Particularly, GPS unit 950 electronically detects when blower 10 is within a boundary such as a golf course fairway and electronically controls ESC 800 to supply 3-phase alternating current to motor 660 to rotate turbine rotors 60 at operation speeds. Additionally, GPS unit 950 electronically detects when blower 10 is outside the boundary such as the golf course fairway and electronically controls ESC 800 to not supply 3-phase alternating current to motor 660 and stopping rotation of turbine rotor 60. Thus, control 100 or 102 electronically stops and rotates turbine rotor 60 at specific locations on the surface.

Additionally, battery pack 700 provides electrical power so that multiple blowers 10 are networked together and pulled in tandem, to clear a golf course fairway of debris in a single pass, with one remote control 100 controlling multiple blowers 10. Particularly, remote control 100 is networked with a transceiver 74*b*A of at least one additional blower 10, such that remote control 100 through transceivers 74*b* and 74*b*A of blowers 10 electronically controls ECSs 800 which in turn supply 3-phase alternating current to motors 660 to rotate turbine rotors 60 of blowers 10.

Blower 10 remedies issues of prior ICE blowers. Blower 10 operates without the use of fossil fuels and does not require additional emissions components, nor is it subject to ICE or emissions testing and taxation. It is small enough to be used in all applications where an ICE-powered mobile turbine blower currently operates while providing similar performance and function to existing models. The power system of blower 10 does not require regular maintenance other than maintaining a battery charge and performing visual inspections, thus reducing the maintenance hours required of trained mechanics.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A battery powered debris blower comprising:
   a housing having a cylindrical shape including a linear axis, a first end and a second end opposite to the first end about the linear axis, the housing transportable with the linear axis being parallel to a surface;
   an exit nozzle rotatably coupled to the second end of the housing, with the exit nozzle having a cylindrical shape including an arcuate axis, with the exit nozzle rotated relative to the housing;
   a turbine stator stationary inside of the housing intermediate the first and second ends;
   a turbine rotor rotatable about the linear axis inside the housing, with the turbine rotor located intermediate the turbine stator and the first end of the housing;
   a high-speed electric motor mounted relative to the housing, wherein the high-speed electric motor uses 3-phase alternating current;
   a direct drive linkage connecting the high-speed electric motor to the turbine rotor;
   a battery pack mounted relative to the housing, wherein the battery pack has a direct current battery voltage of 100 volts;
   a motor controller electrically connected between the battery pack and the high-speed electric motor, the motor controller inverting the direct current battery voltage of the battery pack to the 3-phase alternating current of the high-speed electric motor;
   a body of a cylindrical shape of a smaller diametric size than the cylindrical shape of the housing and circumferentially spaced spindles extending from the body to the inside of the housing, with the turbine stator fixed to the body; a shaft rotatably mounted in the body and the turbine stator and extending along the linear axis, with the turbine rotor being rotatably fixed to the shaft, with the direct drive linkage rotatably connected to the shaft;
   a nozzle motor rotating the exit nozzle about the linear axis relative to the housing; a display displaying information;
   a DC-DC converter electrically connected to the nozzle motor and the display, wherein the DC-DC converter steps down the direct current battery voltage to 12 volts;
   a control controlling the motor controller and the DC-DC converter; and
   a GPS unit networked with the control, with the control stopping and rotating the turbine rotor at specific locations on the surface.

2. The battery powered debris blower of claim 1, further comprising at least one additional battery powered debris blower, with the control networked with a motor controller of at least one additional battery powered debris blower and controlling rotation of the turbine rotor and the turbine rotor of the at least one additional battery powered debris blower.

3. The battery powered debris blower of claim 2, further comprising:
   a chassis including a frame;
   wheels secured to the frame for transporting the frame on the surface;
   a hitch secured to the frame for pulling the frame on the surface;
   a motor mount extending upwardly from the frame, with the high-speed electric motor mounted to the motor mount with the motor mount intermediate the high-speed electric motor and the turbine rotor; and
   a screen guard extending from the frame and between the first end of the housing and the motor mount.

4. A battery powered debris blower comprising
   a housing having a cylindrical shape including a linear axis, a first end and a second end opposite to the first end about the linear axis, the housing transportable with the linear axis being parallel to a surface;

an exit nozzle rotatably coupled to the second end of the housing, with the exit nozzle having a cylindrical shape including an arcuate axis, with the exit nozzle rotated relative to the housing;

a turbine stator stationary inside of the housing intermediate the first and second ends;

a turbine rotor rotatable about the linear axis inside the housing, with the turbine rotor located intermediate the turbine stator and the first end of the housing;

a high-speed electric motor mounted relative to the housing;

a motor controller electrically connected between the battery pack and the high-speed electric motor;

a direct drive linkage connecting the high-speed electric motor to the turbine rotor;

a battery pack mounted relative to the housing;

a control controlling the motor controller; and a GPS unit networked with the control, with the control stopping and rotating the turbine rotor at specific locations on the surface.

5. The battery powered debris blower of claim 4, wherein the battery pack is direct current, wherein the high-speed electric motor is alternating current, with the motor controller inverting direct current of the battery pack to alternating current of the high-speed electric motor.

6. The battery powered debris blower of claim 5, wherein the battery pack provides direct current battery voltage of 100 volts, wherein the high-speed electric motor uses 3-phase alternating current.

* * * * *